US012493700B2

(12) United States Patent
Bergsagel et al.

(10) Patent No.: US 12,493,700 B2
(45) Date of Patent: Dec. 9, 2025

(54) INTEGRATED CIRCUIT WITH ACCELERATED BOOT TO PRIORITY FUNCTION

(71) Applicant: Texas Instruments Incorporated, Dallas, TX (US)

(72) Inventors: Jonathan Bergsagel, Dallas, TX (US); Rajesh Kumar Vanga, Bangalore (IN); Venkateswara Rao Mandela, Bangalore (IN); Gregory Shurtz, Sugar Land, TX (US); Nishanth Menon, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 130 days.

(21) Appl. No.: 18/522,880

(22) Filed: Nov. 29, 2023

(65) Prior Publication Data

US 2025/0028835 A1    Jan. 23, 2025

Related U.S. Application Data

(60) Provisional application No. 63/514,312, filed on Jul. 18, 2023.

(51) Int. Cl.
*G06F 21/57* (2013.01)
*G06F 11/22* (2006.01)

(52) U.S. Cl.
CPC ........ *G06F 21/575* (2013.01); *G06F 11/2284* (2013.01)

(58) Field of Classification Search
CPC .................. G06F 21/575; G06F 11/2284
See application file for complete search history.

(56) References Cited

U.S. PATENT DOCUMENTS

| | | | | |
|---|---|---|---|---|
| 7,856,550 B2* | 12/2010 | Hutchison | ............ | G06F 1/3203 |
| | | | | 713/1 |
| 8,356,168 B2* | 1/2013 | Zimmer | ............... | G06F 9/4401 |
| | | | | 719/327 |
| 12,124,618 B2* | 10/2024 | Lai | ........... | G06F 21/72 |
| 2005/0229066 A1* | 10/2005 | Wolff | ............... | G01R 31/31727 |
| | | | | 714/744 |
| 2014/0089650 A1* | 3/2014 | Polzin | ..................... | G06F 21/81 |
| | | | | 713/2 |
| 2018/0260280 A1* | 9/2018 | Traykov | ............. | G06F 11/1438 |
| 2020/0133686 A1* | 4/2020 | Lakshminarasimha | ..................... | |
| | | | | G06F 9/4416 |
| 2021/0064383 A1* | 3/2021 | Sharma | ................ | G06F 9/4406 |

* cited by examiner

*Primary Examiner* — Zahid Choudhury
(74) *Attorney, Agent, or Firm* — Carl G. Peterson; Frank D. Cimino (57) ABSTRACT

In described examples, a method of operating a system on chip (SoC) includes the following steps. Receive a component description that describes connections among circuit elements of the SoC. Receive a list of specified peripherals to activate while the SoC boots. Receive a hint data that describes a bypass mode clock frequency of a phase locked loop (PLL) of the SoC. Determine an operational data in response to the component description, the hint data, and the specified peripherals. The operational data specifies a subset of the circuit elements required to make the specified peripherals operational. Initialize, and limit the initializing, to the subset of the circuit elements.

20 Claims, 6 Drawing Sheets

INTEGRATED CIRCUIT WITH ACCELERATED BOOT TO PRIORITY FUNCTION

CROSS-REFERENCE TO RELATED APPLICATION

This application claims the benefit of and priority to U.S. Provisional Application No. 63/514,312, filed Jul. 18, 2023, which is incorporated herein by reference.

TECHNICAL FIELD

This application relates generally to boot-up of processing hardware, and more particularly to boot-up of an integrated circuit (IC) to rapidly enable high-priority functionality of the IC.

BACKGROUND

Various devices have different requirements to enable device and system functionality via a device boot process. Additional constraints are added in contexts where secure software execution or data handling is required. In a system on a chip (SoC) or other IC, different circuits with different designs and purposes take different amounts of time to configure and enable for nominal function. In some examples, reordering or rearranging steps of a boot process, or changing how or on which available hardware such steps are performed, can be used to accelerate portions of the boot process or overall boot speed or efficiency, improving device performance.

SUMMARY

In described examples, a method of operating a system on chip (SoC) includes the following steps. Receive a component description that describes connections among circuit elements of the SoC. Receive a list of specified peripherals to activate while the SoC boots. Receive a hint data that describes a bypass mode clock frequency of a phase locked loop (PLL) of the SoC. Determine an operational data in response to the component description, the hint data, and the specified peripherals. The operational data specifies a subset of the circuit elements required to make the specified peripherals operational. Initialize, and limit the initializing, to the subset of the circuit elements specified by the operational data.

DETAILED DESCRIPTION

In some examples, ICs controlling time-critical processes, such as safety, security, or control system processes, have stringent requirements for process response after a startup event such as a power on reset (POR) or other boot-triggering event. Initialization of selected subsystems, such as error correction code-enabled (ECC-enabled) memory, may also be considered time-critical or otherwise high-priority. Disclosed below are processes (such as software and firmware processes) and hardware for accelerating or reordering a boot process of an IC so that one or more time-critical functions of the IC are enabled more quickly after the boot process begins. These processes and hardware are divided, for clarity of description and without limitation, into four categories. Any combination of these processes may be implemented.

First, early boot hardware configuration: phase locked loops (PLLs) and clock circuits can be configured and taken out of bypass mode without using volatile memory to run corresponding configuration software. In some examples of bypass mode, signals produced by a resonator on the IC are passed through reference clock circuits without frequency change. Some intellectual property (IP) cores require some minimum number of clock cycles to initialize. Accordingly, early configuration of PLLs and clock circuits may enable use of faster clock signals during boot, including for early boot processes such as memory test and memory initialization.

Second, secondary boot loader (SBL) execution, and its memory usage, can be configured to further streamline boot-up to quickly activate prioritized functionality. For example, the SBL can be used to limit activation of device peripherals, resources, interfaces, clocks, power sources, and other functionality to that which is necessary to reach activation and operation of prioritized device functionality. Boot functions corresponding to activation and steady-state operation of prioritized device functionality, and to steady-state operation of the device, can be partitioned into a tertiary boot loader. Accordingly, the tertiary boot loader can be used to manage execution of software and firmware enabling and managing nominal function of the IC.

Third, secure and/or public portions of an IC can be used to copy a software image into corresponding secure and/or public memory in parallel with verification of a cryptographic certificate corresponding to the copied image. After image loading and certificate verification are completed successfully, the image is cryptographically authenticated using the verified certificate. Successful image authentication enables the IC to safely execute the image.

Fourth, peripherals, interfaces, and resources required to initialize particular functions are grouped by software into purpose-defined logical groups, referred to herein as device groups, or "devgroups". Example peripherals include serial port or other input/output (IO) controllers such as serial peripheral interface (SPI), octal serial peripheral interface (OSPI), universal asynchronous receiver/transmitter (UART), or Ethernet. Example interfaces include NOR flash memory, NAND flash memory, or double data rate dynamic random access memory (DDR DRAM). Example resources include clock circuits and power domains. Example functions to be initialized include a controller area network (CAN), motor control, or display. During device boot, devgroups required to enable prioritized device functionality are configured and made active prior to devgroups corresponding to lower-priority device functionality.

Figure 1:
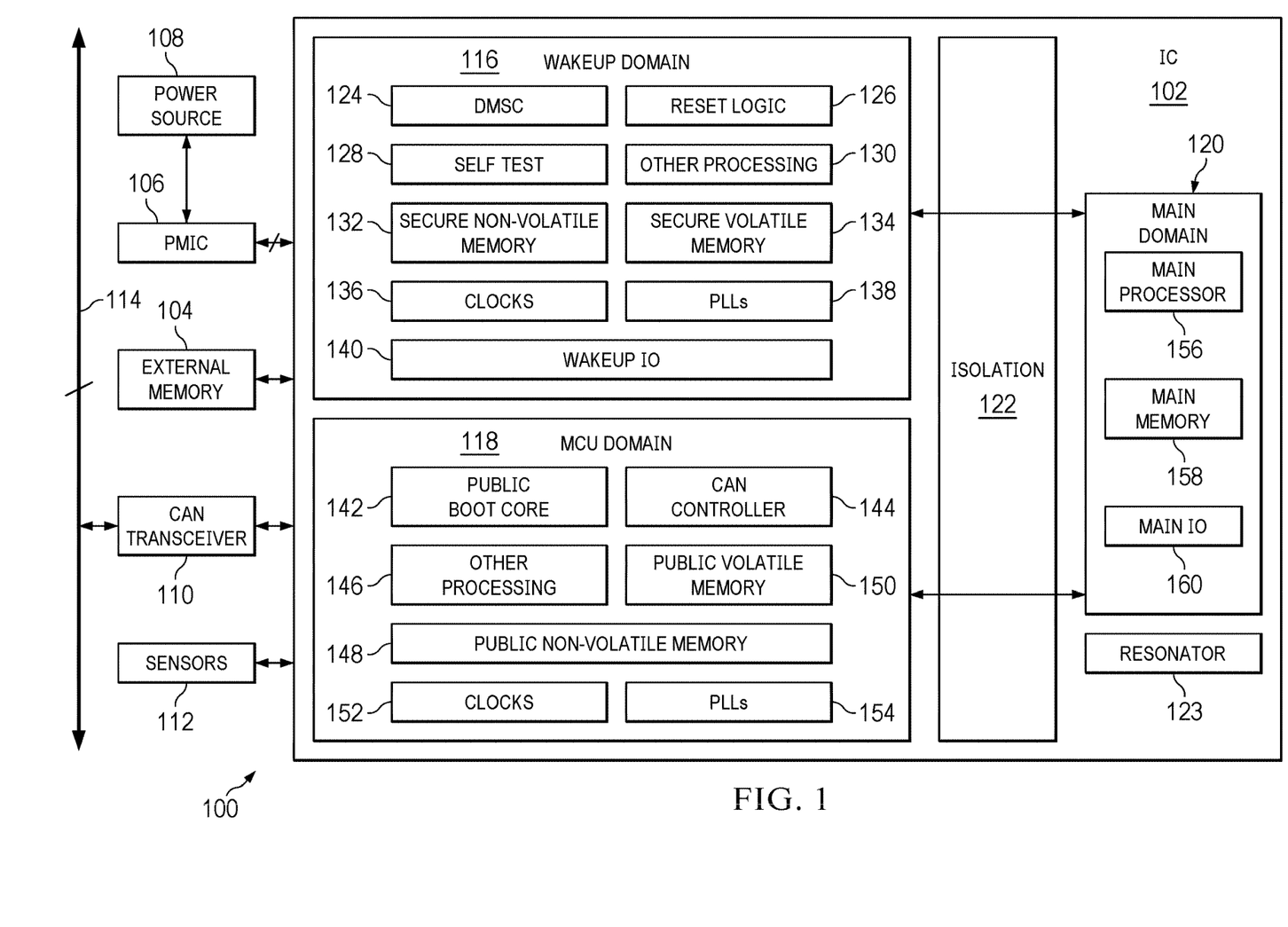
FIG. 1 is a functional block diagram of an example IC system in a vehicle.

FIG. 1 is a functional block diagram of an example IC system 100 in a vehicle (not shown). The IC system includes an IC 102, external memory 104, a power management IC (PMIC) 106, a power source 108 such as a battery connected to the PMIC 106 via a direct current-to-direct current (DC-DC) voltage regulator circuit (not shown), a CAN transceiver 110, sensors 112, and a vehicle bus 114. In some examples, the external memory 104 includes an octal serial peripheral interface (OSPI) flash memory, an embedded multi-media card (eMMC) flash memory, a NAND flash memory, a NOR flash memory, or a double data rate (DDR) random access memory (RAM). The IC 102 includes a wakeup domain 116, a microcontroller unit (MCU) 118 domain, a main domain 120, an isolation 122, and a resonator 123.

The wakeup domain 116 is a secure domain. The wakeup domain 116 includes a device management and security core (DMSC) 124, a reset logic circuit 126, a self-test circuit 128, other processing circuits 130, a secure non-volatile memory 132 (such as a read only memory, or ROM), a secure volatile memory 134 (such as RAM), various clock circuits 136 respectively corresponding to various clock domains of the wakeup domain 116, various PLLs 138 respectively corresponding to different ones of the clock circuits 136, and a wakeup input/output (IO) circuit 140.

The MCU domain 118 is a public domain. The MCU domain 118 includes a public boot core 142, a CAN controller 144, other processing circuits 146, a public non-volatile memory 148, a public volatile memory 150, various clock circuits 152 respectively corresponding to various clock domains of the MCU domain 118, and various PLLs 154 respectively corresponding to different ones of the clock circuits 152. In some examples, the public boot core 142 runs the SBL and the tertiary boot loader. In some examples, the CAN controller 144 interfaces with the CAN transceiver 110, such as via one or more CAN serial input/output (IO) lines (not shown), one or more pins (not shown) of the IC 102, and a CAN interface (in the illustrated example, considered part of the CAN controller 144).

The main domain 120 includes a main processor 156, a main memory 158, and a main IO circuit 160. In some examples, the IC 102 includes IO interfaces additional to (or other than) those shown and described herein.

The power source 108 is connected to provide power to the PMIC 106. The PMIC 106, in turn, is connected to provide power to the IC 102. The PMIC 106 also provides a POR signal to the IC 102. When the POR signal is asserted, the reset logic 126 controls the IC 102 to perform a reset process. When the POR signal is deasserted, the reset logic 126 controls the IC 102 to exit the reset process, perform a boot process, and if the boot process is successful, enter a normal operation mode of the IC 102.

The external memory 104, CAN transceiver 110, and sensors 112 are connected to communicate with the IC 102, such as via the wakeup IO 140 or the main IO 160. The CAN transceiver 110 is also connected to communicate with other circuits (not shown) of the vehicle via the vehicle bus 114. The wakeup domain 116 and the MCU domain 118 are connected to communicate with the main domain 120 via the isolation 122.

Figure 2A:
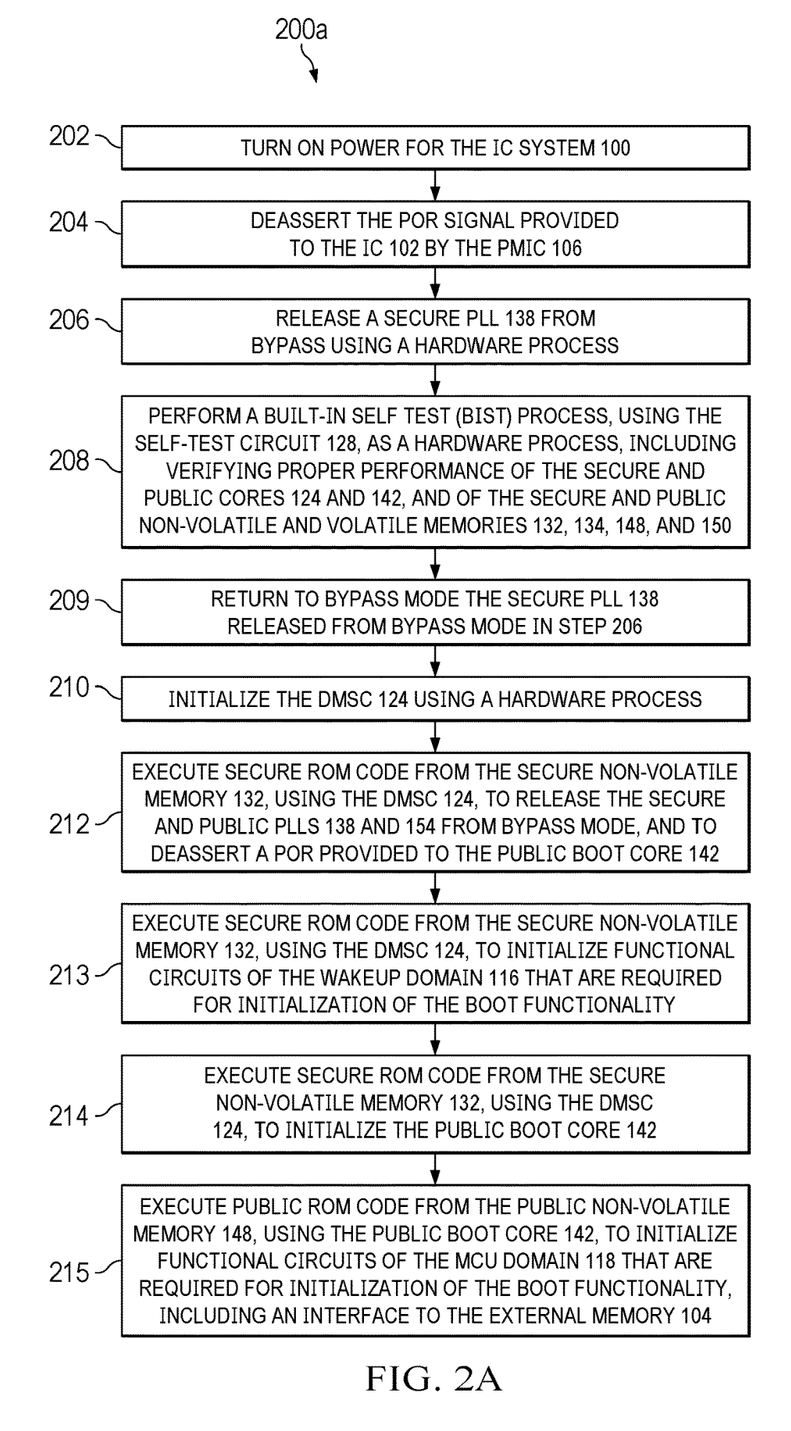
FIG. 2A is a first portion of an example process for boot-up of the IC of FIG. 1.

FIG. 2A is a first portion 200a of an example process 200 for boot-up of the IC 102 of FIG. 1. In step 202, power is turned on for the IC system 100. In some examples, step 202 is initiated by an event external to the IC system 100, such as an automobile ignition ON signal. The PMIC 106 then manages powering up of the various voltage rails or terminals that provide power to the IC 102. The PMIC 106 asserts a POR signal applied to the IC 102 until the voltage rails provide valid signal levels. In step 204, after the voltage rails provide valid signal levels, the PMIC 106 deasserts the POR signal, also referred to as releasing the POR signal.

In step 206, hardware (a hardware process) is used to configure and release from bypass mode a wakeup domain PLL 138 to drive a higher-frequency clock signal that can be used to accelerate performance of a built-in self-test (BIST) process.

When wakeup and/or MCU domain PLLs 138 and/or 154 are released from bypass mode by a software process (after BIST is complete, so that a processing core can be initialized to execute software), configuration of the PLLs 138 and/or 154 includes a processor, such as the DMSC 124, writing PLL configuration information to memory mapped registers (MMRs, not shown) and checking MMR status to ensure the PLLs 138 and/or 154 are locked. In some examples, PLL configuration information includes a predivide factor to predivide a reference clock signal provided by the resonator 123, a multiply factor that dictates the frequency of the PLL 138 or 154 as a function of the predivided reference clock signal, and an output post divider that determines a final output clock signal provided by the PLL as a function of the multiplied reference clock signal. Step 212 performs release of PLLs 138 and 154 from bypass mode as a software process. When a PLL 138 or 154 is released from bypass mode as a hardware process, such as in step 206, hardware directly controls a configuration state of the PLL 138 or 154, overriding the software-controlled MMRs.

While in bypass mode, secure and public clocks 136 and 152 use an output signal of the resonator 123 as their respective clock signal inputs, rather than output signals of the secure and public PLLs 138 and 154. In an example, a resonator 123 is a crystal. The PLLs 138 and 154 multiply the frequency of the output signal of the resonator to provide input signals for respective ones of the secure and public clocks 136 and 152. This means that while they are in bypass mode, the secure and public clocks 136 and 152 operate at relatively slow clock frequencies. Accordingly, processes performed while the PLLs 138 and 154 are in bypass mode, using a clock signal corresponding to and at a frequency of the signal output by the resonator 123, are performed relatively slowly. In an example, the output signal of the resonator 123 has a frequency of 25 megahertz (MHz).

In some examples, an unmodified frequency of the output signal of the resonator 123 is $\frac{1}{20}^{th}$ of a frequency at which the secure and public clocks 136 or 152 operate while in a normal (non-bypass) mode. Accordingly, releasing PLLs 138 and/or 154 from bypass mode early and using the resulting faster clock signals to perform boot functions accelerates the overall boot process. Early bypass release (initialization) of PLLs 138 and/or 154 occurs twice in the process 200. First, in step 206 (as described above), a secure PLL 138 is released from bypass mode to accelerate the BIST performed in step 208. Second, secure and public PLLs 138 and 154 required to reach the prioritized functionality are initialized in step 212 to enable accelerated initialization of (for example) secure and public volatile memories in steps 213 and 215.

In some examples, self-testing of a component, such as using the self-test circuit 128, is required prior to use of the component during and after boot-up. In some examples, the secure and public non-volatile and volatile memories 132, 134, 148, and 150 must be tested prior to use when a system includes automotive safety modes. Memory or other component self-test may also be required for best practices or by laws or regulations with respect to security-related systems, ECC-enabled memory, safety, or control systems (such as supervisory control and data acquisition, or SCADA, systems).

In some examples, the secure and public volatile memories 134 and 150 are required for loading in of software images and data structures and for operation of ROM. Accordingly, configuration and release from bypass mode of a secure PLL 138 using a hardware process, prior to BIST, enables compliance with self-test requirements using a clock signal at a significantly higher frequency than the output signal of the resonator 123. In an example, a clock signal used for BIST is 400 MHz.

In step 208, the self-test circuit 128 performs a built-in self-test (BIST) process, including verifying proper performance of the DMSC 124 and the public boot core 142 (the secure and public processing cores) and the secure and public non-volatile and volatile memories 132, 134, 148, and 150. In some examples, BIST is also used to verify proper performance of other safety features of the IC 102. In some examples, such as depending on regulatory or other design requirements, BIST is used to verify performance of fewer, more, or different functional blocks or circuits of the IC 102. In some examples, secure or public volatile memory 134 or 150 includes ECC memory. The secure and public non-volatile memories 132 and 148 become available, such as for processor cores to read software for execution, after the BIST process completes successfully.

In step 209, following successful completion of the BIST process, the secure PLL 138 released from bypass in step 206 and used in step 208 to drive a clock signal to accelerate step 208 BIST is returned to bypass mode. This is done so that subsequently executing boot software will not see a difference in operation. Accordingly, secure ROM software used to release PLLs 138 and 154 from bypass mode (see step 212) does not need to handle separate cases for when step 206 (releasing one secure PLL 138 from bypass mode) is or is not enabled. In some examples, this simplifies and reduces the cost of development without significantly increasing boot time, and also enables releasing the secure PLL 138 from bypass mode at a different clock frequency than is used for BIST.

In step 210, the DMSC 124 is initialized using hardware. In some examples, initializing the DMSC 124 includes releasing a reset applied to the DMSC 124 and beginning execution by the DMSC 124 of software in the secure non-volatile memory 132. Steps 212, 213, 214, and 215 are performed as if using a microcontroller that does not include volatile memory, and so are executed using non-volatile memory. As further described below, secure volatile memory 134 is initialized as part of step 212 so that it is available at the start of step 213, and public volatile memory 150 is initialized as part of step 215 so that it is available for step 216. The DMSC 124 runs secure ROM code from the secure non-volatile memory 132, and can use the secure volatile memory 134 to do so once the secure volatile memory 134 is initialized. Similarly, the public boot core 142 (initialized in step 214, below) runs public ROM code from the public non-volatile memory 148 (for example, in step 215), and can use the public volatile memory 150 to do so once the public volatile memory 150 is initialized.

In step 212, the DMSC 124 executes secure ROM code from the secure non-volatile memory 132 to release the secure and public PLLs 138 and 154 from bypass mode. Because the volatile memories 134 and 150 are not initialized yet, this secure ROM code is run as if using a microcontroller that does not include volatile memory. Execution directly from non-volatile memory is referred to as execute in place (XIP). Volatile memory initialization is performed after the PLLs 138 and 154 are released from bypass mode, to avoid performance impact corresponding to memory initialization using the outputs signal of the resonator 123. In an example, the secure PLL 138 previously used for BIST is released from bypass in step 212 so that it provides a signal with a frequency of one gigahertz (GHz).

In step 213, the DMSC 124 executes secure ROM code from the secure non-volatile memory 134 to initialize functional circuits of the (secure) wakeup domain 116 that are required for initialization of the boot functionality. Also, the DMSC 124 controls the reset logic 126 to release (deassert) a POR signal applied to the public boot core 142. Functional circuits initialized in step 213 correspond to secure peripherals, resources, interfaces, and corresponding secure clock and power structure. In some examples, cryptographic accelerators, a corresponding direct memory access (DMA) controller, peripherals such as the CAN controller 144, and other processing 130, are configured and activated.

In step 214, the DMSC 124 executes secure ROM code from the secure non-volatile memory 134 to initialize the public boot core 142. In step 215, the public boot core 142 executes public ROM code from the public non-volatile memory 150 to initialize functional circuits of the (public) MCU domain 118 that are required for initialization of the boot functionality, including an interface to the external memory 104. For example, a boot peripheral such as an OSPI controller, corresponding to a peripheral that communicates with the external memory 104 that stores the SBL (such as a flash memory), is configured and activated. In some examples, other processing 146 is also configured and activated. In some examples, initialization described in steps 212, 213, 214, and 215 is limited to functional circuits required to reach activation of prioritized functionality, such as CAN network functionality.

Figure 2B:
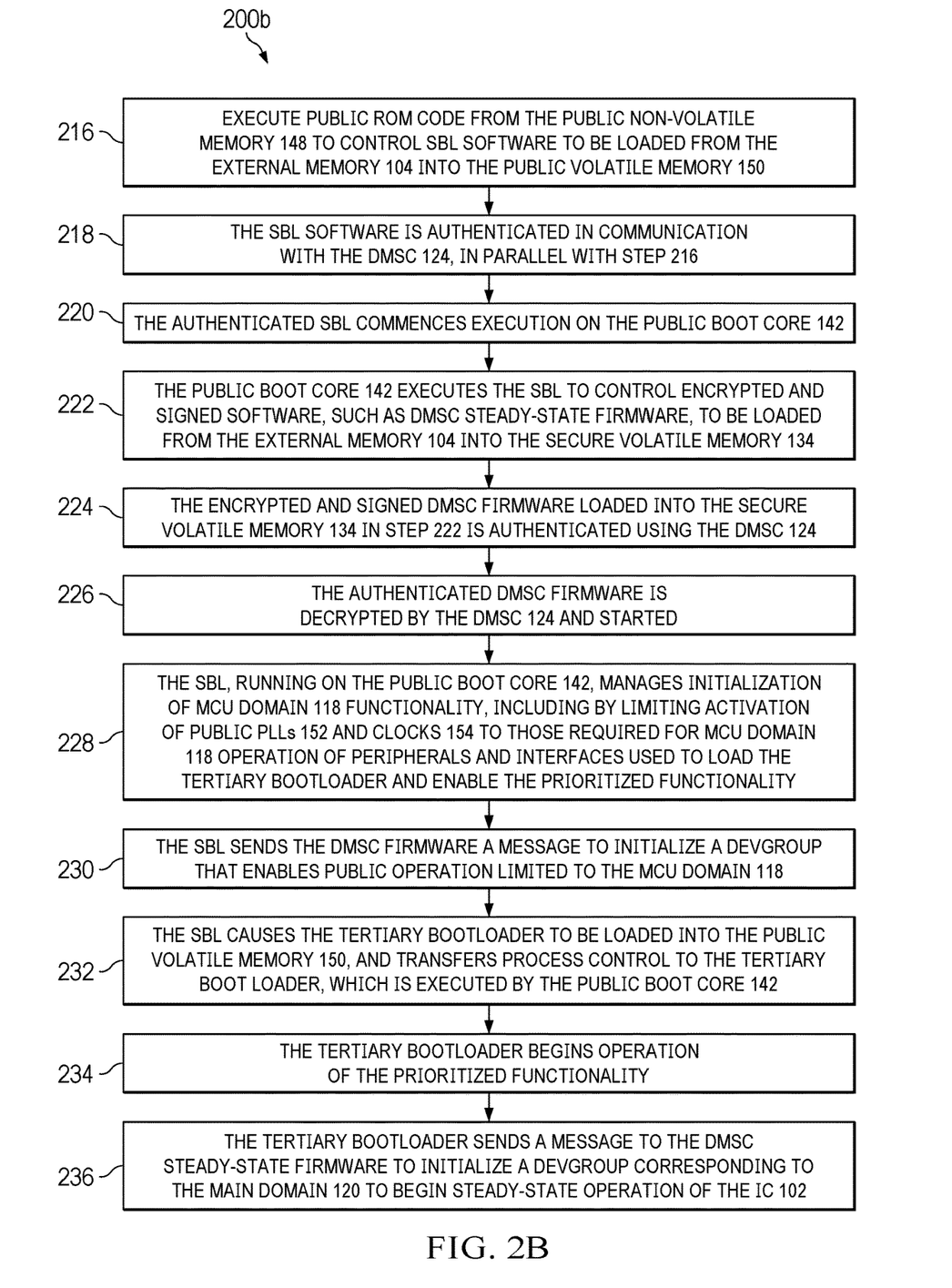
FIG. 2B is a second portion of the example process of FIG. 2 for boot-up of the IC of FIG. 1.

FIG. 2B is a second portion 200b of the example process 200 of FIG. 2A for boot-up of the IC 102 of FIG. 1. In step 216, the public boot core 142 executes public ROM code from the public non-volatile memory 148 to control SBL software to be loaded from the external memory 104 into the public volatile memory 150. In some examples, loading of software (or other data) from external memory 104 into volatile memory 148 or 150 is mediated by the DMSC 124 executing secure ROM code. For example, the public boot core 142 executing public ROM code causes software to be loaded from external memory 104 into a portion of the public volatile memory 150 (such as a temporary memory) allocated for use by the public boot core 142. The DMSC 124, executing secure ROM code, causes the software to be moved from the temporary memory portion of the public volatile memory 150 to a (in some examples, larger) portion of the public volatile memory 150 from which the software will be executed (or from which data will be accessed during execution). In some examples, device management software, used to activate peripherals and allocate resources to peripherals, is loaded as part of the SBL or is loaded subsequent to the SBL.

In step 218, the DMSC 124 executes secure ROM code from the secure non-volatile memory 134 to authenticate the SBL software. Authentication is further disclosed with respect to FIG. 3. In some examples, all software images loaded into memory of the IC 102 from external memory 104 (rather than XIP) are authenticated prior to execution. In some examples, other software images loaded into memory of the IC 102 are (or are also) authenticated prior to execution.

In step 220, the authenticated SBL software commences execution. The SBL is executed using the public boot core 142. In step 222, the SBL controls loading of encrypted and signed software, corresponding to a DMSC steady-state firmware, from the external memory 104 into the secure volatile memory 134. The DMSC steady-state firmware controls security of the IC 102. For example, the DMSC steady-state firmware authenticates images for booting cores, sets up firewalls to isolate resources, and decrypts images with keys available only to the DMSC 124. In some examples, the DMSC 124 executes secure ROM code to authenticate software (or otherwise respond to authentication requests) until the DMSC steady-state firmware is loaded into secure volatile memory 134 and authenticated. Thereafter, the DMSC 124 executes the DMSC steady-state firmware to perform authentication of software loaded into memory of the IC 102 (or otherwise respond to authentication requests).

In step 224, the DMSC 124 executes secure ROM code from the secure non-volatile memory 134 to authenticate the DMSC steady-state firmware. In step 226, the authenticated DMSC steady-state firmware is decrypted by the DMSC 124, and the DMSC 124 begins to execute the DMSC steady-state firmware.

In step 228, the SBL manages initialization of MCU domain 118 functionality, including by limiting activation of public PLLs 154 and clocks 152 to those required for MCU domain 118 operation of peripherals, resources, and interfaces used to load the tertiary bootloader and enable the prioritized functionality. In some examples, this limitation is enforced using the devgroups functionality. In some examples, activation of a clock 152 with a particular clock signal frequency corresponds to causing a PLL 154 to generate a signal with the particular clock signal frequency.

In step 230, the SBL sends the DMSC steady-state firmware a message to configure and enable public peripherals, resources, interfaces, and corresponding public clock and power structure, required for operation limited to the MCU domain. In some examples, this corresponds to the SBL sending the DMSC firmware a message to initialize a devgroup that enables public operation limited to the MCU domain. Devgroups provide an efficient way to call for a limited, explicitly defined set of peripherals to be initialized. Clock structure includes PLLs, configuration of specified clock frequencies (for example, specifying PLL divider scalars), and activation of corresponding clock circuits. Enabled public clock and power structure is limited to what is needed for reaching loading and execution of the tertiary bootloader, and initialization of the prioritized functionality. In some examples, the SBL limiting enablement of clock and power structure, and preventing early power-on of the main domain 120, is enabled by booting the SBL from a domain that includes a non-volatile memory storing the SBL, or a peripheral in communication with an external memory 104 (such as OSPI flash) that stores the SBL. The SBL or the tertiary bootloader In step 232, the SBL causes the tertiary bootloader to be loaded from the public non-volatile memory 148 into the public volatile memory 150, requests the DMSC 124 to authenticate the tertiary bootloader, and begins execution of the tertiary boot loader using the public boot core 142 following successful authentication. Accordingly, the same core is used to execute the tertiary boot loader as is used to execute the SBL. The tertiary bootloader controls nominal operation of the IC 102.

In an alternative example of step 232, the SBL requests the DMSC 124 to authenticate software in the external memory 104 (such as OSPI flash memory), and following successful authentication, transfers process control to and begins execution of the tertiary bootloader directly from the external memory 104. Execution directly from external memory 104 is an XIP process. XIP saves time that would be taken to load the nominal operation software from the external memory 104 into the MCU domain 118, and from there to the main domain 120. In some examples, copying nominal operation software into memory of the IC 102 can be performed later, during a less time-critical phase of operation; or skipped.

In step 234, the tertiary bootloader requests additional clock and power structure be activated, and begins operation of the prioritized functionality. In some examples, the prioritized functionality is a CAN network. Once the CAN network is activated, the IC can begin transmitting CAN messages via the CAN controller to the external CAN transceiver. In step 236, the tertiary bootloader sends a message to the DMSC steady-state firmware to initialize a devgroup corresponding to the main domain 120 to begin steady-state operation of the IC 102.

Figure 3:
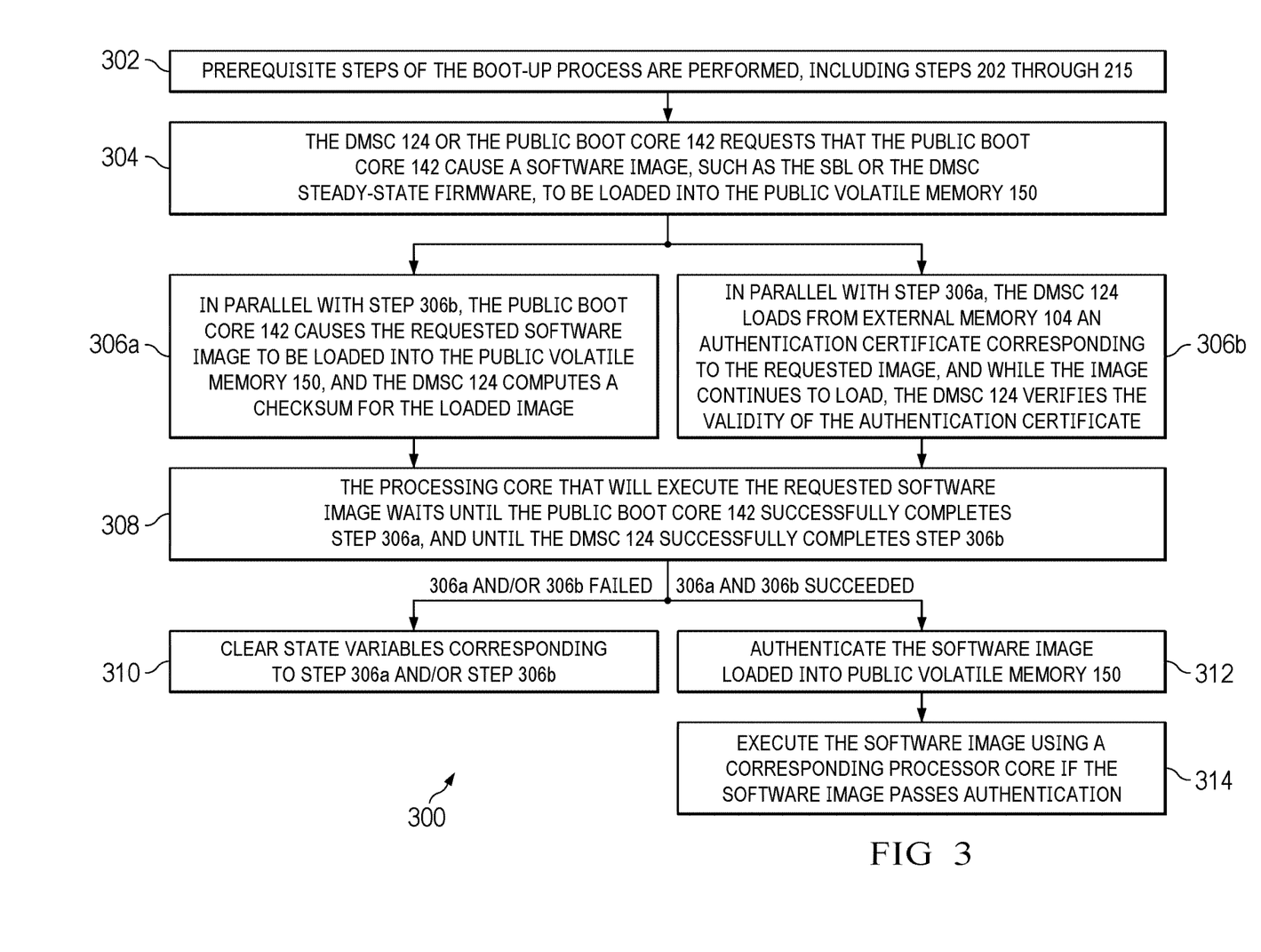
FIG. 3 is an example process for performing authentication and non-secure actions of the boot process in parallel, and then performing secure actions of the boot-up process of FIG. 2.

FIG. 3 is an example process 300 for performing authentication and non-secure actions of the boot process in parallel, and then performing secure actions of the boot-up process 200 of FIG. 2. In some examples, a public or secure core requests a software image. In response, an authentication certificate corresponding to the software image is loaded from external memory into non-volatile memory. The secure core verifies the validity of the authentication certificate. In some examples, verification of the authentication certificate is a blocking operation, so that the requested software image is loaded into non-volatile memory and a corresponding checksum is determined only after verification of the authentication certificate completes successfully. However, image loading, checksum determination, and certificate loading can be performed so that they do not change a security state of the IC system 100, and so that they are reversible if image loading, checksum determination, or authentication fails. Authentication can fail, for example, if the determined checksum does not match the checksum in the authentication certificate. Accordingly, reversible refers to the ability to clear state variables tracking whether the image and certificate are loaded and the checksum computed, as further described below.

In step 302, prerequisite steps of the boot-up process are performed, including (for example) steps 202 through 215 (see FIG. 2). In step 304, the DMSC 124 or the public boot core 142 requests that the public boot core 142 cause a software image, such as the SBL or the DMSC steady-state firmware, to be loaded into the public volatile memory 150. In response, in step 306a, the public boot core 142 causes the requested software image to be loaded into the public volatile memory 150, and the DMSC 124 computes a checksum for the loaded image. As described above, the public boot core 142 loading a software image from external memory 104 into public volatile memory 150 is mediated by the DMSC 124 executing secure ROM code. In some examples, the checksum is computed as an SHA2-512 checksum. In some examples, a different cryptographic algorithm is used, such as SHA1, a different SHA2 variant, or SHA3.

In some examples, code executed by the public boot core 142 to perform step 304 and/or step 306 is, prior to the SBL being loaded and authenticated, public ROM code in the public non-volatile memory 148. After the SBL is loaded and authenticated, the executed code is the SBL. In some examples, code executed by the DMSC 124 to perform steps 304 and 306b is, prior to the DMSC steady-state firmware being loaded and authenticated, secure ROM code in the secure non-volatile memory 134. After the DMSC steady-state firmware is loaded and authenticated, the executed code is the DMSC steady-state firmware.

In step 306b, in parallel with step 306a, the DMSC 124 loads from external memory 104 into the secure volatile memory 134 an authentication certificate corresponding to the requested image, and while the image continues to load, the DMSC 124 verifies the validity of the authentication certificate. In some examples, the external memory 104 from which the authentication certificate is loaded is an OSPI flash memory. In some examples, verification is done by first parsing to detect an expected certificate structure, and then cryptographically verifying the authenticity and integrity of the certificate. In some examples, verification is performed using the Rivest-Shamir-Adleman (RSA) verify algorithm, the elliptic curve digital signature algorithm (ECDSA) verify algorithm, or a different verification algorithm. In some examples, loading a software image takes three to ten milliseconds (ms), and verifying an authentication certificate takes six milliseconds.

In some examples, the software image being loaded is the DMSC steady-state firmware (which is loaded using execution of the SBL). After the DMSC steady-state firmware is loaded into the public volatile memory 150, the DMSC 124 requests the SBL load the DMSC steady-state firmware from the public volatile memory 150 into the secure volatile memory 134. In some examples, this transfer from public volatile memory 150 to secure volatile memory 134 is part of step 306a. In some examples, transfer of the DMSC steady-state firmware from external memory 104 to public volatile memory 150 is performed prior to step 306a, and the transfer from public volatile memory 150 to secure volatile memory 134 is performed as step 306a, in parallel with step 306b. In some examples, other combinations of these transfers are step 306, performed in parallel with step 306b. In some examples, determination of the checksum is performed prior to or as part of step 306a. In some example, a software image other than the SBL or the DMSC steady-state firmware is loaded and authenticated using the process 300. Alternatively, in some examples, only authenticated images can be moved from public volatile memory 150 to secure volatile memory 134.

In step 308, the processing core (for example, the DMSC 124 or the public boot core 142) that will execute the requested software image waits until the public boot core 142 and the DMSC 124 successfully complete step 306a (image loading and checksum determination), and until the DMSC 124 provides acknowledgment messages to itself and to the public boot core 142 that step 306b (certificate loading and verification) completed successfully. Step 308 is a synchronization step, reconciling different durations of the non-secure actions corresponding to step 306a and the secure actions corresponding to step 306b. Step 308 includes determining whether steps 306a and 306b were successful. In some examples, failure of step 306a can be caused by failed reads of the external memory 104 or failed writes of the secure or public volatile memory 134 or 150. Determining whether step 306a failed is responsive, for example, to whether a corresponding error interrupt or other error message is received. Determining whether step 306b failed is responsive, for example, to whether the DMSC 124 provides acknowledgment messages indicating certificate verification success. If steps 306a and 306b both succeeded, then the process proceeds to step 312. Otherwise, step 310 is performed.

In step 310, state variables corresponding to step 306a and 306b are cleared. Clearing these state variables corresponds to, for example, clearing variables that track whether the requested software image and certificate are loaded and the checksum is computed. Alternatively, clearing the state variables can include wiping the image binaries from the public volatile memory 150 (and/or the secure volatile memory 134), or otherwise deallocating corresponding memory. In some examples, failure of step 306a results in clearing state variables corresponding to whether the requested software image is loaded and the checksum is computed. In some examples, failure of step 306b results in clearing state variables corresponding to whether the certificate is loaded. Step 310 can be followed by, for example, a POR of the IC 102, a repeated attempt to load the software image and/or the certificate, a transition to a safe operating mode, or a POR or other error handling process that includes additional portions of the IC system 100 (such as the external memory 104).

In step 312, the software image, loaded into public volatile memory 150, is authenticated by the DMSC 124 by comparing the computed checksum to a reference checksum included in the verified authentication certificate. In step 314, if the software image passes authentication, the software image is executed by a corresponding processor core, such as the public boot core 142.

In some examples, other operations that are reversible and do not impact a security state (non-secure operations) can be performed in parallel with other secure operations. Secure operations include, for example, setting up a firewall, opening a debug port, giving process control to a software loaded from an external memory, or using an encryption key to perform encryption or decryption.

Figure 4:
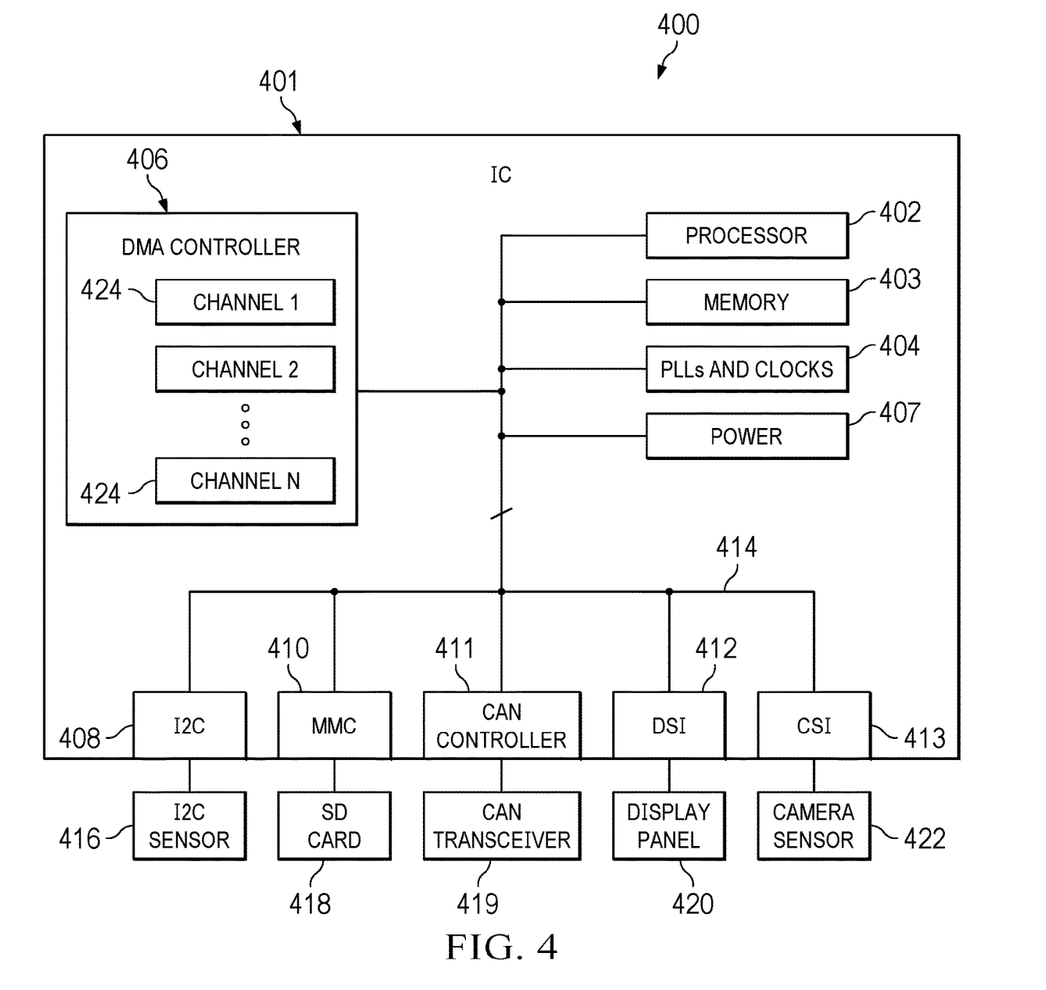
FIG. 4 is a functional block diagram of another example IC system in a vehicle.

FIG. 4 is a functional block diagram of another example IC system 400 in a vehicle. The IC system 400 includes an IC 401, an inter-integrated circuit (I2C) sensor 416, a secure digital (SD) card 418, a CAN transceiver 419, a display panel 420, and a camera sensor 422. The IC 401 includes a processor 402, a memory 403, PLLs and clock circuits 404, a direct memory access (DMA) controller 406, power circuits 407, an I2C interface 408, a multimedia card (MMC) interface 410, a CAN controller 411, a display serial interface (DSI) 412, a camera serial interface (CSI) 413, and a bus 414 (in some examples, other arrangements of interconnects or other electrical connections). The DMA controller 406 includes a number N channels 424.

The bus 414 connects the DMA controller 406 to the processor 402, the memory 403, the PLLs and clock circuits 404, the I2C interface 408, the MMC interface 410, the DSI 412, and the CSI 413. The I2C 408 is connected to the I2C sensor 416, the MMC 410 is connected to the SD card 418, the CAN controller 411 is connected to the CAN transceiver 419, the DSI 412 is connected to the display panel 420, and the CSI 413 is connected to the camera sensor 422.

Devgroups are used to control initialization of specified peripherals, along with the resources and interfaces required to initialize the specified peripherals, and the power controls and clock controls needed to support operation of the specified peripherals and corresponding resources and interfaces. Peripherals are hardware functional blocks that communicate with components external to an IC such as the IC 102 or the IC 401. For example, peripherals include interfaces such as the I2C interface 408, the MMC interface 410, the CAN controller 411, the DSI 412, and the CSI 413.

Devgroups group peripherals, resources, and interfaces into software-defined logical groups. In some examples, a devgroup is targeted at a specified purpose. Resources manage movement of data between functional block of the IC 401. For example, resources include the channels 424, which can be allocated to move data between a peripheral and a memory (such as the memory 403), or between a peripheral and another peripheral. Another example resource is a firewall (not shown). Firewall configuration can be performed at bus level or at peripheral (endpoint) level. Firewalls are used to limit access to provide safety and security functions in the IC 401. Interfaces are segments of the bus 414 (or a set of interconnects) that connect structures in the IC 401 and that can be separately allocated.

In some examples, resources, interfaces, power controls, and clock controls that must be enabled to enable a peripheral are IC-specific. However, in some examples, different ICs that include a peripheral, such as an instance of the MMC interface 410 or the DSI 412, use the same identifier for the peripheral—for example, MMC0 (a first instance of the MMC interface 410 on the IC 401) or DSI1 (a second instance of the DSI 412 on the IC 401). In some examples, different Ics also use the same identifiers for resources and interfaces. Accordingly, in some examples, hardware blocks (such as peripherals, resources, and interfaces) that are different examples of the same type of hardware block have the same identifiers across different Ics, such as different IC designs in a product line, or different Ics that are revisions of a same design.

This enables components to be described with a level of abstraction that enables firmware in different ICs 401 to assign and enable power and clocking circuitry corresponding to device components. Accordingly, components can be described with a level of abstraction such that firmware in a first IC 401 will be able to understand a correct clocking hierarchy to enable a corresponding example MMC0, and firmware in a second IC 401 will be able to understand a correct clocking hierarchy to enable a corresponding, different example MMC0. Accordingly, an identifier of a peripheral or other component can be agnostic between different ICs 401 (or other ICs) that include one or more instances of the same peripheral or other component. This enables users to reference peripherals, resources, and interfaces using device manager firmware in a manner that is agnostic with respect to specific internal structure of the IC 401, such as clock and power hierarchies and numbers of instances of particular components. In some examples, hardware or software (or other code other than firmware) is used to reference IC 401 components.

In some examples, reference to components of the IC 401 that are agnostic with respect to internal structure of the IC 401 refers to the ability to match IC-independent component descriptions for requesting that components be enabled to IC-dependent component descriptions that specify corresponding clock and power dependencies and other connectivity and/or other component properties. In some examples, key peripherals are used across a variety of IC 401 designs, enabling lower cost optimization and/or optimization with respect to an IC 401 design being substantially applicable to other IC 401 designs.

Figure 5:
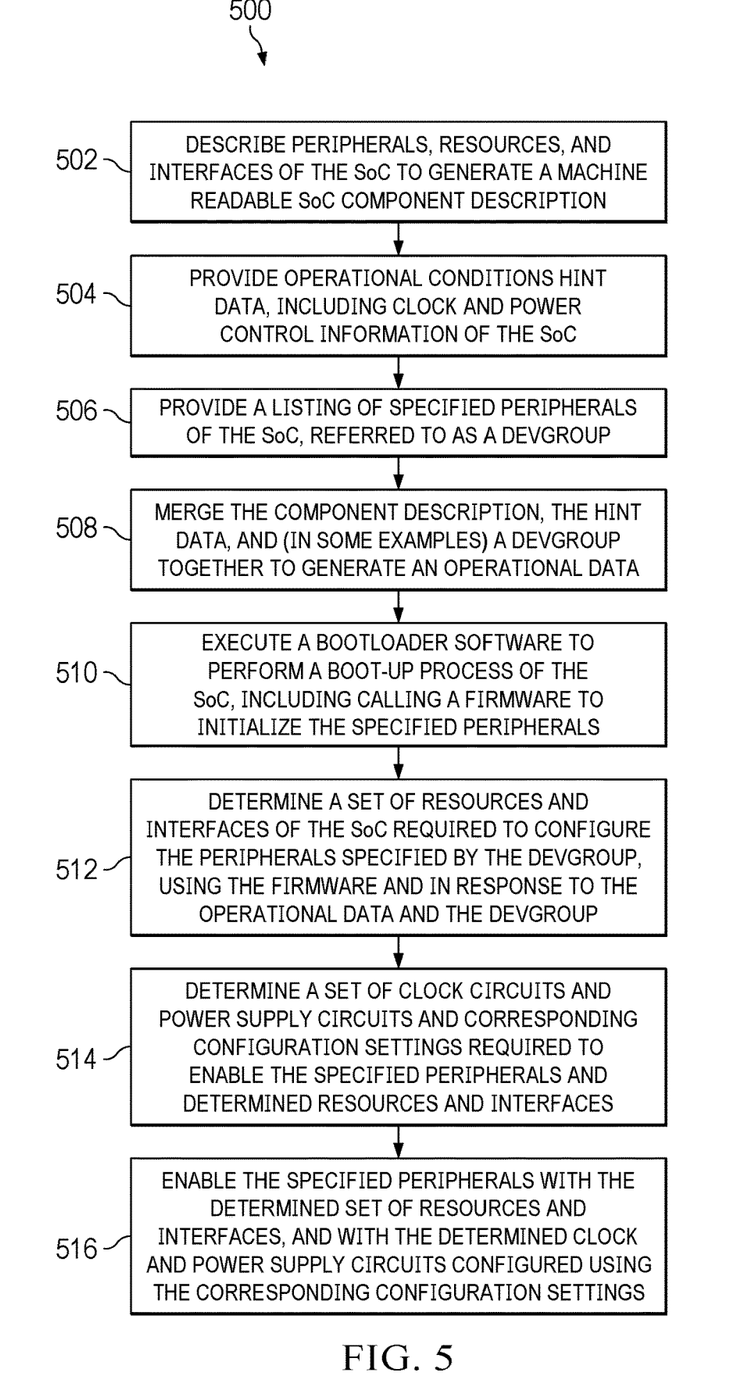
FIG. 5 is an example process for organizing devgroups and using devgroups to initialize peripherals, interfaces, and resources during the boot-up process of FIG. 2.

FIG. 5 is an example process 500 for organizing devgroups and using devgroups to initialize peripherals, interfaces, and resources during the boot-up process 200 of FIG. 2. In step 502, provide (or receive) a machine readable SoC component description corresponding to peripherals, resources, and interfaces of an SoC, such as the IC 102 or 401. In some examples, a component description is user-generated, or is generated by an automated process. In some examples, the component description describes connections among peripherals, resources, interfaces, clock circuits, and power circuits of the SoC. In some examples, connections among clock circuits correspond to one or more clock hierarchies, such as connections between a resonator, a voltage controlled oscillator (VCO) of a PLL, and a PLL divider (corresponding to a divider factor). In some examples, connections among power circuits correspond to one or more power hierarchies. In some examples, the component description describes how different clock hierarchies and power hierarchies connect to (accordingly, supply) different corresponding functional blocks, such as different peripherals, resources, and interfaces. Accordingly, the component description describes functional dependencies of functional blocks on clock circuits and on power supply circuits.

In step 504, provide (or receive) an operational conditions hint data (a hint data) of the SoC. In some examples, operational conditions hint data is user-generated, or is generated by an automated process. Operational conditions hint data includes, for example, clock and power control information of the SoC, such as bypass mode frequency and nominal mode frequency information for PLLs, power supply information, and functional block clock frequency and power supply requirements. Accordingly, in some examples, operational conditions hint data includes clock frequency and power supply requirements for peripherals, resources, and interfaces.

In step 506, provide (or receive) a listing (in some examples, an ordered listing) of specified peripherals of the SoC, referred to as a devgroup. In some examples, this listing is user-generated, or is generated by an automated process. In some examples, the specified peripherals are those required to enable a specified functionality of the SoC. Resources, interfaces, and clock and power structure required for the devgroup to function are determined later using firmware. The listing of specified peripherals can be provided as a data file, such as a json file formatted into machine readable code.

In step 508, merge the component description, the hint data, and (in some examples) a devgroup (such as the devgroup received at step 506) together to generate an operational data. In some examples, this is done at a pre-compile stage, and the resulting operational data is stored in external memory 104 or in internal memory of the SoC, such as flash memory used to store firmware. In some examples, the operational data is generated using a script.

An operational data includes data structures that represent which circuits to enable (in some examples, in what order), including which clock circuits and power supply circuits to enable, and how to configure clock circuits and power supply circuits to be enabled, when a firmware (or other executed code) processes a request to enable specified peripherals, such as peripherals specified in the devgroup. In some examples, these data structures include similar information with respect to enabling resources and interfaces, such as those required to enable the specified peripherals. In some examples, these data structures include information regarding the connections among components described with respect to the component description. In some examples, an order in which to enable circuits corresponds to clock and power supply hierarchies described by the component description. Information related to enabling and configuring clock circuits is referred to herein as clock information, and information related to enabling and configuring power supply circuits is referred to herein as power supply information. The operational data is used to help speed up enabling the devgroup.

Clock information includes, for example, for the various PLLs of the SoC, a crystal resonator input frequency, a voltage controlled oscillator (VCO) frequency of a PLL, an output frequency of the PLL, and a PLL divider (corresponding to a divider factor) to use. These together are stable operating frequencies and controls of the PLL to enable clock circuits to provide corresponding clock signals at frequencies described in the hint data. In some examples, after being loaded from memory, clock information is stored in corresponding registers used by the SoC responsive to execution of code such as a device manager software running in the public boot core 142 or the DMSC 124 (or other secure or public processing core). These registers are used as references for setting operational parameters, such as control voltages and currents, for corresponding PLL and other clock-related structures. In some examples, power supply information similarly includes data to be stored in registers and used to set operational parameters.

In step 510, execute a boot loader software for performing a boot-up process of the SoC. In some examples, the executing of the boot loader software includes calling a firmware to initialize the specified peripherals. In some examples, the operational data is part of a device manager software or firmware, such as firmware called in step 510 and used to perform steps 512, 514, and 516. Accordingly, the operational data is loaded into volatile memory of the IC 102 at runtime.

In some examples, the operational data is part of a data structure (or data structures) used by the DMSC steady-state firmware, the SBL, and/or the tertiary boot loader. In some examples, the operational data is loaded into the secure volatile memory 134 along with the DMSC steady-state firmware in step 222. In some examples, a portion of the operational data is stored in the public volatile memory 150 for use by the SBL and the tertiary boot loader, and a portion of the operational data is stored in the secure volatile memory 134 for use by the DMSC steady-state firmware. In some examples, the SBL or tertiary boot loader uses the operational data to generate a request to initialize a devgroup. This request is then sent to the DMSC 124 for execution using the DMSC steady-state firmware. For example, the DMSC steady-state firmware uses the operational data to perform the devgroup initialization described with respect to step 230. Peripherals initialized in step 230 are used in steps 232 and/or 234. The tertiary bootloader uses the operational data to perform the devgroup initialization described with respect to step 236.

Steps 512, 514, and 516 correspond to execution of the firmware. In step 512, in response to the operational data and the devgroup, the firmware determines a set of resources and interfaces of the SoC required to configure the peripherals specified by the devgroup. In some examples, step 512 corresponds to the firmware locating information relating to peripherals specified in the devgroup within the data structures of the operational data, and then correlating this information with respective resources and interfaces specified by the data structures as required to enable corresponding specified peripherals. In step 514, determine a set of clock circuits and power supply circuits and corresponding configuration settings required to enable the specified peripherals and determined resources and interfaces. This determination is made by traversing the component connections specified by the operational data. In some examples, this traversal is referred to as a logic walk. In step 516, enable the specified peripherals with the determined set of resources and interfaces, and with the determined clock and power supply circuits configured using the corresponding configuration settings.

In some examples, multiple different devgroups are initialized in an order corresponding to prioritization of functionality enabled by respective devgroups. In some examples, a main devgroup, corresponding to enabling the main domain 120 so that the IC 102 can operate in with steady-state functionality, is called late or last in a boot-up process. In some examples, the main devgroup is called by the tertiary boot loader. In some examples, enabling a peripheral requires enabling functionality including corresponding clock signals, power, configuration of corresponding firewall(s) (if any), applicable DMA resources (if any), and enabled and clocked bus segments.

Modifications are possible in the described examples, and other examples are possible within the scope of the claims.

In some examples, the IC 102 or 401 is a system on chip (SoC).

In some examples, PLLs 138 or 154 or clocks 136 or 152 are configured by hardware.

In some examples, domains have different levels of security or public access than those described herein.

In some examples, different functional circuits are included within respective domains than those described herein.

In some examples, a boot process includes different steps, or steps are executed in a different order, than described herein.

In some examples, BIST tests additional and/or other functionality and/or functional blocks than those described herein.

In some examples, the main domain 120 includes memory that stores a primary boot loader.

In some examples, authentication of secure code is performed differently than described herein.

In some examples, functionality other than prioritized functionality (and functionality necessary to enable prioritized functionality) is initialized or partially enabled in parallel with enablement of prioritized functionality, but is not fully enabled until after the prioritized functionality is fully enabled.

In some examples, instead of step 222, the SBL controls loading of the nominal (steady-state) operation software (such as the tertiary boot loader) to be loaded from the external memory 104 into the public volatile memory 150. The nominal operation software can then be executed from the volatile memory 150, or copied into and executed from main memory 158.

In some examples, operational data includes firmware configuration information.

In this description, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

A device that is "configured to" perform a task or function may be configured (for example, programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (for example, a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to include the replaced components to provide functionality at least partially similar to functionality available prior to the component replacement.

The term "couple" is used throughout the specification. The term may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

While certain elements of the described examples may be included in an IC and other elements are external to the IC, in other examples, additional or fewer features may be incorporated into the IC. In addition, some or all of the features illustrated as being external to the IC may be included in the IC and/or some features illustrated as being internal to the IC may be incorporated outside of the IC. As used herein, the term "IC" means one or more circuits that are: (i) incorporated in/over a semiconductor substrate; (ii) incorporated in a single semiconductor package; (iii) incorporated into the same module; and/or (iv) incorporated in/on the same circuit board.

Unless otherwise stated, "about," "approximately," or "substantially" preceding a value means +/−10 percent of the stated value, or, if the value is zero, a reasonable range of values around zero.

What is claimed is:

1. A method of operating a system on chip (SoC), the method comprising:
   receiving a component description that describes connections among circuit elements of the SoC;
   receiving a list of specified peripherals to activate during a boot-up process of the SoC;
   receiving a hint data that describes a bypass mode clock frequency of a phase locked loop (PLL) of the SoC;
   determining an operational data in response to the component description, the hint data, and the specified peripherals, wherein the operational data specifies a subset of the circuit elements, and wherein the subset of the circuit elements are required to make the specified peripherals operational; and
   initializing, and limiting the initializing, to the subset of the circuit elements specified by the operational data.

2. The method of claim 1, wherein initializing the subset of the circuit elements is part of the boot-up process of the SoC.

3. The method of claim 1, wherein the component description includes one or more of: a resonator input frequency, a voltage controlled oscillator (VCO) frequency of the PLL, an output frequency of the PLL, or a PLL divider factor.

4. The method of claim 1, wherein the specified peripherals include one or more of: an inter-integrated circuit (I2C) interface, a multimedia card (MMC) interface, a controller area network (CAN) controller, a display serial interface (DSI), or a camera serial interface (CSI).

5. The method of claim 1, wherein the circuit elements include one or more of: a direct memory access (DMA) channel or a firewall.

6. The method of claim 1, wherein the circuit elements include one or more segments of a bus or one or more segments of a set of interconnects.

7. The method of claim 1, further comprising:
   initiating the boot-up process of the SoC;
   operating, in a bypass mode, multiple PLLs of the SoC to generate respective bypass mode signals at a first frequency;
   releasing from the bypass mode a selected one of the PLLs, so that the selected PLL generates a nominal mode signal at a second frequency that is greater than the first frequency;
   performing a built-in self-test (BIST) process, in response to the nominal mode signal, to verify performance of a memory and/or of a processor of the SoC;
   returning the selected PLL to the bypass mode in response to successful completion of the BIST, so that the selected PLL generates its respective bypass mode signal at the first frequency;
   releasing from the bypass mode the multiple PLLs, so that the multiple PLLs generate respective nominal mode signals at respective third clock frequencies that are greater than the first frequency; and
   executing code stored in a memory of the SoC in response to the nominal mode signals at the respective third clock frequencies.

8. The method of claim 1, further comprising:
   initiating the boot-up process of the SoC;
   initializing functional circuits of a secure domain of the SoC;
   initializing functional circuits of a public domain of the SoC;
   executing a first boot loader stored in a memory of the public domain to initialize functionality of the public domain;
   limiting, in response to execution of the first boot loader, activation of clock circuitry and power circuitry of the public domain to circuitry required to initialize peripherals and interfaces used to load a second boot loader and/or to enable a prioritized functionality;
   loading the second boot loader into a memory of the public domain in response to execution of the first boot loader; and
   executing the second boot loader, from the memory of the public domain, to enable steady-state operation of the SoC and/or to enable the prioritized functionality.

9. An integrated circuit (IC) comprising:
   multiple circuit elements including a phase locked loop (PLL);
   a processor; and
   a memory storing instructions that, when executed by the processor, cause the processor to:

receive a component description that describes connections among the circuit elements;

receive a list of specified peripherals to activate during a boot-up process of the IC;

receive a hint data that describes a bypass mode clock frequency of the PLL;

determine an operational data in response to the component description, the hint data, and the specified peripherals, wherein the operational data specifies a subset of the circuit elements, and wherein the subset of the circuit elements are required to make the specified peripherals operational; and initialize, and limit the initializing, to the subset of the circuit elements specified by the operational data.

10. The IC of claim 9, wherein the PLL is available to provide a clock signal to the specified peripherals.

11. The IC of claim 9, wherein initializing the subset of the circuit elements is part of the boot-up process of the IC.

12. The IC of claim 9, wherein the component description includes one or more of: a resonator input frequency, a voltage controlled oscillator (VCO) frequency of the PLL, an output frequency of the PLL, or a PLL divider factor.

13. The IC of claim 9, wherein the specified peripherals include one or more of: an inter-integrated circuit (I2C) interface, a multimedia card (MMC) interface, a controller area network (CAN) controller, a display serial interface (DSI), or a camera serial interface (CSI).

14. The IC of claim 9, wherein the circuit elements include one or more of: a direct memory access (DMA) channel or a firewall.

15. The IC of claim 9, wherein the circuit elements include one or more segments of a bus or one or more segments of a set of interconnects.

16. An integrated circuit (IC) comprising:
a processor;
multiple public domain functional circuits;
multiple secure domain functional circuits; and
a first memory, a second memory, and an instruction memory;
the instruction memory storing instructions that, when executed by the processor, cause the processor to:
initiate a boot-up process of the IC;
initialize the secure domain functional circuits;
initialize the public domain functional circuits;
load an authentication certificate corresponding to a software image into the first memory;
load the software image into the second memory of the IC;
verify the authentication certificate in parallel with the loading of the software image;
wait for the loading of the software image action and the verify action to both complete successfully;
authenticate the loaded software image using the verified authentication certificate; and
execute the loaded software image in response to determining that the loaded software image is authentic.

17. The IC of claim 16, wherein the first memory is a secure memory of the IC, the second memory is a public memory of the IC, and the authentication certificate and the software image are loaded from external to the IC.

18. The IC of claim 16,
wherein the processor includes a public boot core and a secure boot core; and
wherein actions in a public domain are at least partially responsive to instructions executed by the public boot core, and actions in a secure domain are responsive to instructions executed by the secure boot core.

19. The IC of claim 18, wherein the loading of the software image action includes the public boot core causing the software image to be loaded into a first portion of the second memory, and includes the secure boot core causing the software image to be moved from the first portion of the second memory to a second portion of the second memory.

20. The IC of claim 19, wherein the instruction memory stores instructions that, when executed by the processor, cause the processor to determine a checksum of the software image, using the secure boot core and contemporaneously with the secure boot core causing the software image to be moved.

* * * * *